United States Patent [19]

Mitsugu et al.

[11] Patent Number: 5,003,836
[45] Date of Patent: Apr. 2, 1991

[54] WORM GEAR MOTOR WITH A BUILT-IN SENSOR

[75] Inventors: Teruyuki Mitsugu, Nanjyou; Norio Umezawa, Takefu, both of Japan

[73] Assignee: Matsushita Electric Industrial Co., Ltd., Kadoma, Japan

[21] Appl. No.: 376,595

[22] Filed: Jul. 7, 1989

[30] Foreign Application Priority Data

Jul. 8, 1988 [JP] Japan .............. 63-91329[U]

[51] Int. Cl.⁵ .............................. F16H 1/16
[52] U.S. Cl. ...................... 74/425; 324/174
[58] Field of Search ........... 74/89.14, 425; 324/174, 324/179

[56] References Cited

U.S. PATENT DOCUMENTS

| | | | |
|---|---|---|---|
| 2,821,185 | 1/1958 | McCarty et al. | 123/146.5 A |
| 3,719,841 | 3/1973 | Ritsema | 324/174 X |
| 4,011,476 | 3/1977 | Beard | 324/179 X |
| 4,014,301 | 3/1977 | Happel | 123/275 |
| 4,364,011 | 12/1982 | Bloomfield et al. | 324/174 |
| 4,748,865 | 6/1988 | Umezawa et al. | 74/425 X |
| 4,756,207 | 7/1988 | Bianchi et al. | 74/425 X |

Primary Examiner—Allan D. Herrmann
Attorney, Agent, or Firm—Wenderoth, Lind & Ponack

[57] ABSTRACT

A worm gear for driving devices such as automobile power windows and power seats the operating positions of which have to be precisely determined. The worm gear motor has a built-in sensor means having a torque transmission plate engaged with a motor-driven worm wheel having an output shaft in its center and at least one circumferentially extending notch on the periphery, a magnet disposed on one side of the torque transmission plate along the path of the notch during rotation of the torque transmission plate and a magnetic sensor disposed on the other side of the torque transmission plate opposite the magnet. The sensor repeats ON-OFF cycles according to the presence or absence of the notch while said motor is in operation, detecting a predetermined rotational position of the output shaft by the signal attained by the sensor, and attaining a high positional determination of the motor output shaft regardless of backlash of engaged gears and mechanical inertia of the motor components.

2 Claims, 2 Drawing Sheets

WORM GEAR MOTOR WITH A BUILT-IN SENSOR

BACKGROUND OF THE INVENTION

1. Field of the invention

This invention relates to a worm gear motor for an automotive power seat or a power window.

2. Brief Description of the Prior Art

Since the motor of this type is mounted in a limited space, it must be small-sized, lightweight and robustly built so as to operate with high precision. It is, therefore, difficult to incorporate a control sensor in the drive mechanism.

With the conventional power window, for instance, the car driver must visually monitor the roll-up or roll-down motion of the glass pane and stop its motion in the desired position by manipulating a drive switch. However, performing such an operation during the driving of the car tends to distract the driver from concentration on driving and is therefore dangerous.

SUMMARY OF THE INVENTION

It is a primary object of this invention to provide a compact worm gear motor equipped with built-in sensor means.

It is another object of this invention to provide a highly dependable, high-precision worm gear motor equipped with built-in sensor means which is capable of detecting the rotational position of the output shaft without regard to the backlash of the gear.

The above objects have been accomplished by this invention, which provides a worm gear motor comprising a worm gear formed at the free end of a motor shaft, a worm wheel meshed with said worm gear, a torque transmission plate operatively connected to said worm gear and having a central output shaft and at least one circumferentially extending peripheral notch, a magnet disposed on one side of said torque transmission plate in a position corresponding to the path of said peripheral notch and a magnetic sensor associated with said magnet similarly disposed on the other side of said torque transmission plate.

In the worm gear motor equipped with built-in sensor means according to this invention, the rotational force of the worm gear is transmitted to the torque transmission plate and the output shaft attached to the center of the torque transmission plate is accordingly caused to rotate.

With the rotation of the torque transmission plate, the contact of the built-in sensor disposed in juxtaposition with the magnet is closed by the magnetic flux from the magnet when the notch of the torque transmission plate comes into a position between the magnet and the sensor, and the contact is open when the notch is not in that position. Therefore, while the motor is rotating, the sensor repeats a cycle of ON and OFF according to the presence or absence of the notch of the torque transmission plate. The frequency of such cycles is dependent on the available number of notches in the torque transmission plate and can, therefore, be optionally selected. The ON-OFF time ratio can also be selected as desired by varying the ratio of the circumferential length of the notch to that of the notch-free region (projection).

By detecting the rotational position of the output shaft with the torque transmission plate to which the output shaft is connected in the above manner, the tilting position of the power seat, or the degree of opening of the power window, which is driven by the output shaft can be set with greater precision without taking into account the backlash of the gear and the offset effect of the damper.

DETAILED DESCRIPTION OF THE PREFERRED EMBODIMENTS

Figure 1:
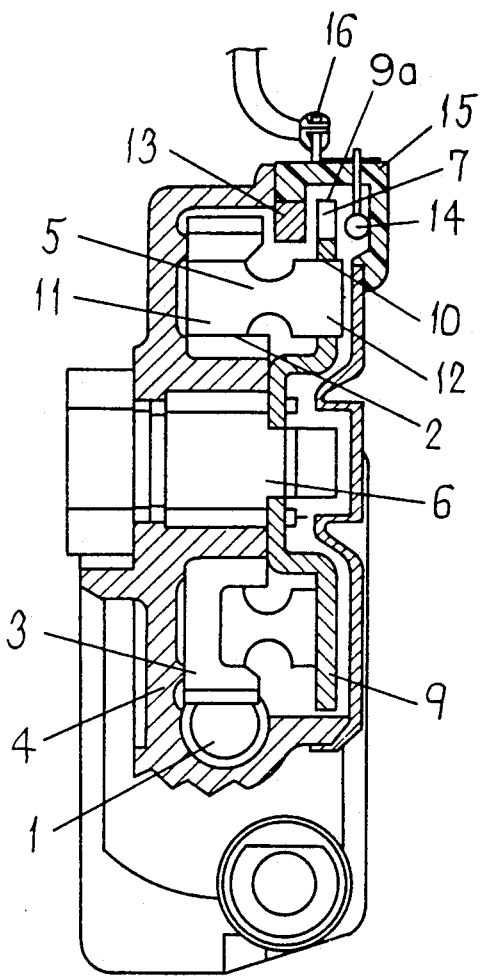
FIG. 1 is a sectional view, showing in cross-section, a worm gear motor equipped with built-in sensor means according to an embodiment of this invention.
Figure 2:
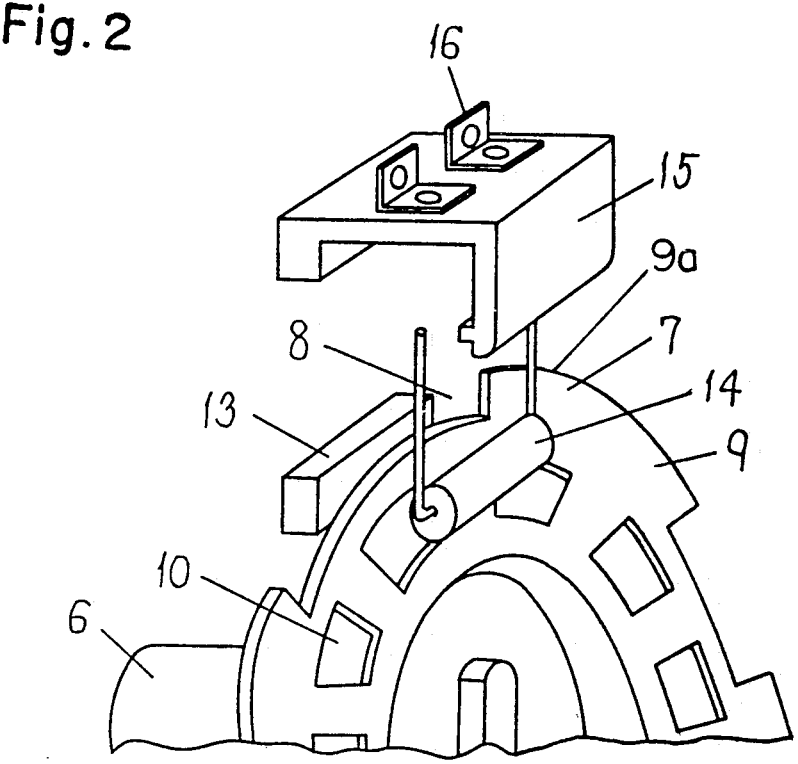
FIG. 2 is a perspective view showing the arrangement of the magnet, sensor and torque transmission plate.
Figure 3:
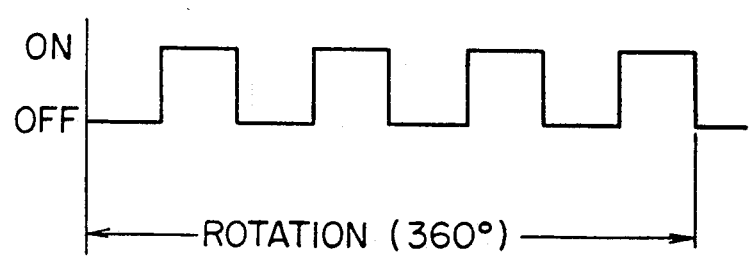
FIG. 3 is a diagram showing a sensor signal waveform.

Referring to FIGS. 1, 2 and 3, a worm gear 1 formed at the free end of a motor shaft and a worm wheel 3 having a plurality of damper-mounting holes 2 are meshed together at right angles and mounted rigidly in a gear case 4.

A torque transmission plate 9 of magnetic material having plural circumferential projections 7 on the rim portion 9a defining 8 therebetween and a centrally extending output shaft 6 is connected to a damper 5 by way of plural damper mounting holes 10 and this torque transmission plate 9 is positioned in concentric relation with the worm wheel 3. As illustrated, the disk-shaped damper 5 has plural projections 11 and 12 for mounting the worm wheel 3 and torque transmission plate 9 on respective sides. As illustrated in FIG. 2, a magnet 13 is mounted on one side of the torque transmission plate in a position corresponding to the path of said projections and notches 8 during rotation of the torque transmission plate 9 and a reed switch 14, which is a magnetic sensor, is mounted on the other side of the torque transmission plate opposite the magnet 13 with a suitable spacing of said elements from either side of the torque transmission plate 9. The magnet 13 and reed switch 14 are mounted on a synthetic resin holder 15 and accommodated fixedly in the gear case 4.

The reed wires of said reed switch 14 extend from terminals 16 of the holder 15. It should be understood that although a reed switch is used as a sensor, any other suitable sensor can of course be employed.

The operation of the thus-constructed worm gear motor equipped with built-in sensor means is explained below. The rotation of the worm gear 1 drives the worm wheel 3. The revolution of the worm wheel 3 is transmitted through the damper 5 mounted thereon to the torque transmission plate 9. Then, as the positions of the projections 7 and notches 8 of the torque transmission plate 9 move between the magnet 13 and lead switch 14, the magnetic flux from the magnet 13 is intermittently intercepted to open and close the contact of the reed switch 13. In this embodiment wherein the torque transmission plate has four projections 7 and four notches 8, a four-pulse signal waveform shown in FIG. 3 is obtained through the terminal 16 as the lead switch 14 performs four ON-OFF actions per revolution of the output shaft 6.

INDUSTRIAL APPLICABILITY

Thus, this invention provides a compact and sturdy worm gear sensor equipped with built-in sensor means which is highly dependable and features high control precision wherein the rotational position of the output shaft can be accurately detected without interference by the backlash of the gear.

When this worm gear motor is applied to a powder window or power seat of an automobile, the driver can operate it without being distracted from concentration on driving and, hence, without risking his or her safety.

We claim:

1. A worm gear motor having a built in sensor means, comprising:
   a motor shaft;
   a worm gear on said motor shaft;
   a rotatably mounted worm wheel in mesh with said worm gear;
   a torque transmission plate connected with said worm wheel for rotation therewith and having an output shaft in the center thereof and at least one circumferentially extending notch in a rim portion thereof;
   a magnetic disposed on one side of said torque transmission plate in a position along a path of movement of notch during rotation of said torque transmission plate; and
   a magnetic sensor mounted separately from said magnet and on the other side of said torque transmission plate opposite said magnet for being exposed to magnetic flux from said magnet when said notch is between said magnet and said magnetic sensor, said magnetic sensor consisting of a reed switch having reeds movable in response to the presence or absence of magnetic flux the magnetic flux from said magnet into and out of contact for making and breaking a circuit as said notch and said rim portion pass between said magnet and said reed switch.

2. A magnetic sensor as claimed in claim 1 in which said torque transmission plate is a dish-shaped element made of magnetic material and having at least one notch in said rim portion.

* * * * *